United States Patent
Manoukian et al.

(10) Patent No.: US 10,416,960 B2
(45) Date of Patent: *Sep. 17, 2019

(54) CHECK PROCEDURE FOR FLOATING POINT OPERATIONS

(71) Applicant: Imagination Technologies Limited, Kings Langley (GB)

(72) Inventors: Manouk Manoukian, Hertfordshire (GB); Leonard Rarick, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,595

(22) Filed: Jun. 1, 2017

(65) Prior Publication Data

US 2017/0269902 A1    Sep. 21, 2017

Related U.S. Application Data

(63) Continuation of application No. 14/328,753, filed on Jul. 11, 2014, now Pat. No. 9,678,714.

(51) Int. Cl.
*G06F 7/483* (2006.01)
*G06F 7/499* (2006.01)
*G06F 7/535* (2006.01)
*G06F 7/552* (2006.01)

(52) U.S. Cl.
CPC .............. *G06F 7/483* (2013.01); *G06F 7/499* (2013.01); *G06F 7/535* (2013.01); *G06F 7/5525* (2013.01)

(58) Field of Classification Search
CPC .... G06F 7/499; G06F 7/49947; G06F 7/4917; G06F 7/5525
See application file for complete search history.

(56) References Cited

U.S. PATENT DOCUMENTS

| | | | |
|---|---|---|---|
| 5,434,809 A | 7/1995 | Taniguchi | |
| 5,764,555 A | 6/1998 | McPherson et al. | |
| 7,689,642 B1 | 3/2010 | Rarick | |
| 9,678,714 B2 * | 6/2017 | Manoukian | G06F 7/483 |
| 2004/0158600 A1 | 8/2004 | Markstein et al. | |
| 2007/0143389 A1 | 6/2007 | Lyu et al. | |
| 2012/0226730 A1 | 9/2012 | Fit-Florea | |

FOREIGN PATENT DOCUMENTS

GB    2488665 A    9/2012

* cited by examiner

*Primary Examiner* — Chuong D Ngo
(74) *Attorney, Agent, or Firm* — Vorys, Sater, Seymour and Pease LLP; Vincent M DeLuca

(57) ABSTRACT

Method and computer system for implementing an operation on ≥1 floating point input, in accordance with a rounding mode, e.g. using a Newton-Raphson technique. The floating point result comprises a p-bit mantissa. An unrounded proposed mantissa result is determined using the Newton-Raphson technique, wherein a p-bit rounded proposed mantissa result, t, corresponds to a rounding of the unrounded proposed mantissa result in accordance with the rounding mode, with k leading zeroes. If an increment to the $(m-k)^{th}$ bit of the unrounded result would affect the p-bit rounded result then the input(s) and bits of the unrounded result are used to determine a check parameter which is indicative of a relationship between an exact result and the unrounded result if the $(m-k)^{th}$ bit were incremented. The p-bit mantissa of the floating point result, is determined in dependence upon the check parameter, to be either t or t+1.

20 Claims, 3 Drawing Sheets

CHECK PROCEDURE FOR FLOATING POINT OPERATIONS

BACKGROUND

A floating point format allows a wide range of values to be represented with relatively few bits. A floating point number may be represented using binary bits including a sign bit, a set of bits representing an exponent, and another set of bits representing a mantissa (or "significand"). The value of a binary floating point number is given by mantissa$\times 2^{exponent}$ with the sign of the number given by the sign bit. The precision of a floating point number is determined by the number of bits used for the mantissa, whilst the range of the floating point number is determined by the number of bits used for the exponent.

The mantissa of a normal number (i.e. not a subnormal number which is described below) is normalised such that it has no leading zeroes. Therefore, the mantissa of a normal number always starts with a one. As such, the first mantissa bit does not need to be stored. That is, a normalised mantissa represents a binary number $m_0.m_1m_2m_3 \ldots m_{p-2}m_{p-1}$, where $m_i$ represents a binary digit at position i, p is the precision, and $m_0$ is non-zero such that $m_0$ does not need to be stored). For example, a "single precision" floating point number comprises a sign bit, 8 exponent bits and 24 mantissa bits (23 of which are actually stored). As another example, a "double precision" floating point number comprises a sign bit, 11 exponent bits and 53 mantissa bits (52 of which are actually stored).

Floating point values are not uniformly spaced. Instead, the spacing between representable floating point numbers decreases as the magnitude of the numbers decreases. With normal floating point numbers, the mantissa starts with a one, and the exponent sets the scale. However, the exponent has a limited range (limited by the number of bits used to represent the exponent). Subnormal numbers (which may also be referred to as "denormal" numbers) are numbers where a normalised mantissa would result in an exponent that is too small to be represented by the exponent bits. Subnormal numbers are represented using leading zeroes in the mantissa. In a subnormal number, the exponent is the minimum that it can be, and the first bit of the mantissa is a zero (i.e. the mantissa represents a binary number $0.m_1m_2m_3 \ldots m_{p-2}m_{p-1}$). This allows numbers closer to zero than the smallest normal number to be represented. If subnormal numbers are not used then there is an underflow gap of numbers which cannot be represented between the smallest normal number and zero. This underflow gap can be filled using subnormal numbers. By filling the underflow gap like this, significant digits are lost, but not to the extent of losing all the significant digits for numbers in the underflow gap. Therefore, subnormal numbers provide a gradual underflow which allows a calculation to lose precision gradually when the result is small.

Computers may perform floating point operations (e.g. division and square root operations) on floating point numbers using a converging approximation technique, which may use a quadratic convergence algorithm such as a Newton-Raphson technique or a Goldschmidt technique. In particular, the converging approximation technique may converge towards a floating point result from below, such that a proposed result provided by the converging approximation is never too large, i.e. it is either correct or it is too small. The proposed result provided by the converging approximation technique can be rounded, in accordance with a rounding mode, to provide a rounded proposed result.

The precision of the final floating point result is p (i.e. there are p bits in the mantissa of the final result). The unrounded proposed mantissa result (i.e. the mantissa of the result of the converging approximation technique) may be determined with greater precision, such that it has m bits of accuracy where m>p. That is, the unrounded proposed mantissa result may have s bits of data, where p<m<s, and where for each iteration of the convergence algorithm, more of the bits of the unrounded proposed mantissa result are accurate, wherein the convergence algorithm stops when the unrounded proposed mantissa result has m bits of accuracy. The extra precision provided by the unrounded proposed mantissa result compared to the precision that is required in the rounded proposed mantissa result is given by m-p. Due to the nature of the converging approximation technique, the unrounded proposed mantissa result may not be correct in its unit of least precision (ulp), i.e. the $m^{th}$ bit of the unrounded proposed mantissa result. Since the unrounded proposed mantissa result is calculated with a higher precision than the final floating point result, the rounded proposed mantissa result will most of the time equal the correctly rounded mantissa result. However, there are some situations in which the rounded proposed mantissa result might be wrong by one unit of least precision. In these situations a check procedure can be used to detect and fix an error in the rounded proposed mantissa result.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The inventors have realised that a check procedure, which may be used to detect and fix errors in rounded proposed mantissa results, can use bits of the unrounded proposed mantissa result and the input(s) to the floating point operation to determine a check parameter. The check parameter may indicate either that the rounded proposed mantissa result is correct or that the rounded proposed mantissa result should be incremented. The unrounded proposed mantissa result is often available before the rounded proposed mantissa result. Therefore, by using bits of the unrounded proposed mantissa result (rather than bits of the rounded proposed mantissa result) to determine the check parameter, the check parameter can be determined sooner, thereby reducing the delay incurred by performing the check procedure. Furthermore, in examples described below, the same check procedure can be used for normal floating point results and for subnormal floating point results. Furthermore, in examples described below, the same steps can be carried out for the check procedure for different rounding modes and for normal and subnormal results. Therefore, the number of different functions that are implemented in the check procedure can be reduced compared to having a specific function for the check procedure for each particular rounding mode and for each of normal or subnormal results. This may help to reduce the size and complexity of the check procedure logic as well as helping to reduce the delay incurred in performing the check procedure.

There is provided a method of implementing a floating point operation on at least one floating point input in a computer system, in accordance with a rounding mode and using a converging approximation technique which converges towards a floating point result from below, wherein the floating point result comprises a mantissa with p bits, the method comprising: receiving the at least one floating point input; determining an unrounded proposed mantissa result in accordance with the converging approximation technique, wherein a rounded proposed mantissa result comprising p bits corresponds to a rounding of the unrounded proposed mantissa result in accordance with the rounding mode with k leading zeroes, where $0 \leq k < p$, and wherein the unrounded proposed mantissa result comprises (m−k) bits of precision determined in accordance with the converging approximation technique, where p and m are positive integers and m>p; determining whether a check is to be performed based on whether an increment to the $(m-k)^{th}$ bit of the unrounded proposed mantissa result would affect the p-bit rounded proposed mantissa result; and if it is determined that a check is to be performed: using the at least one floating point input and bits of the unrounded proposed mantissa result to determine a check parameter which is indicative of a relationship between: (i) an exact result of the floating point operation on the at least one floating point input, and (ii) the unrounded proposed mantissa result if the $(m-k)^{th}$ bit were incremented; and determining the p-bit mantissa of the floating point result, in dependence upon the check parameter, to be either: (i) the p-bit rounded proposed mantissa result, or (ii) an increment to the p-bit rounded proposed mantissa result.

There is provided a computer system configured to implement a floating point operation on at least one floating point input, in accordance with a rounding mode using a converging approximation technique which converges towards a floating point result from below, wherein the floating point result comprises a mantissa with p bits, the computer system comprising: converging approximation logic configured to determine an unrounded proposed mantissa result in accordance with the converging approximation technique, wherein a rounded proposed mantissa result comprising p bits corresponds to a rounding of the unrounded proposed mantissa result in accordance with the rounding mode with k leading zeroes, where $0 \leq k < p$, and wherein the unrounded proposed mantissa result comprises (m−k) bits of precision determined in accordance with the converging approximation technique, where p and m are positive integers and m>p; decision logic configured to determine whether a check is to be performed based on whether an increment to the $(m-k)^{th}$ bit of the unrounded proposed mantissa result would affect the p-bit rounded proposed mantissa result; check logic configured to, if it is determined that a check is to be performed, use the at least one floating point input and bits of the unrounded proposed mantissa result to determine a check parameter which is indicative of a relationship between: (i) an exact result of the floating point operation on the at least one floating point input, and (ii) the unrounded proposed mantissa result if the $(m-k)^{th}$ bit were incremented; and determining logic configured to determine the p-bit mantissa of the floating point result, in dependence upon the check parameter, to be either: (i) the p-bit rounded proposed mantissa result, or (ii) an increment to the p-bit rounded proposed mantissa result.

There may be provided computer readable code for generating a computer system according to any of the examples described herein. There may be provided computer readable code adapted to perform the steps of any of the methods described herein when the code is run on a computer. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
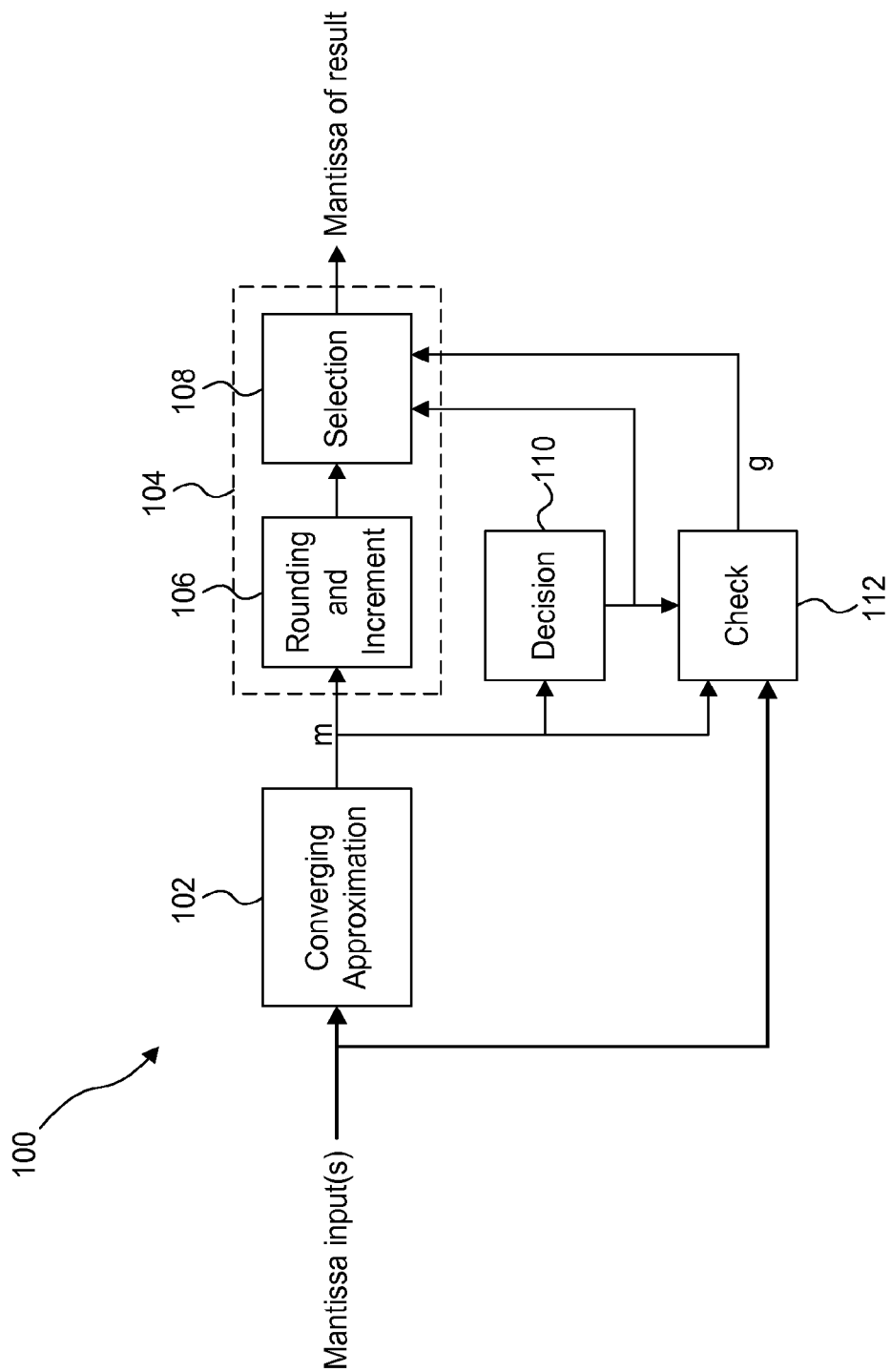
FIG. 1 shows a computer system configured to implement a floating point operation on one or more floating point inputs.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element.

DETAILED DESCRIPTION

As described above, a computer system (e.g. implemented in computer hardware) is used to implement a floating point operation on at least one floating point input to determine a floating point result, wherein the mantissa of the floating point result comprises p bits (i.e. p is the precision of the floating point result).

As described above, an unrounded proposed mantissa result can be determined using a converging approximation technique, which may use a quadratic convergence algorithm, e.g. a Newton Raphson technique or a Goldschmidt technique. For a normal result, the unrounded proposed mantissa result comprises m bits of precision, denoted $x_0$ to $x_m$, where the first bit of the unrounded proposed mantissa result, $x_0$, is always a 1, such that the unrounded proposed mantissa result comprises bits (1, $x_1$, $x_2$, . . . $x_{p-1}$, $x_p$, $x_{p+1}$, . . . $x_{m-1}$). As mentioned above, m>p. The extra precision provided by the unrounded proposed mantissa result compared to the precision that is required in the rounded proposed mantissa result is given by m−p.

The rounded proposed mantissa result, t, is obtained from the unrounded proposed mantissa result depending on the rounding mode, as described in the examples below. Three examples of rounding modes which may be used are: (i) a round towards zero mode (which is also referred to herein as a "round down mode") in which the absolute value of the unrounded proposed mantissa result is rounded down, (ii) a round away from zero mode (which is also referred to herein as a "round up mode") in which the absolute value of the unrounded proposed mantissa result is rounded up, and (iii) a round towards nearest mode in which the unrounded proposed mantissa result is rounded to the nearest rounded value. The round to nearest mode may use a ties-to-even method in which if an unrounded value is exactly half way between two candidate rounded values then it will round to the even one of the candidate rounded values.

1.1) For a normal result:
(i) in a round up mode, the rounded proposed mantissa result, t, is given by an increment to the first p bits of the unrounded proposed mantissa result, i.e.:

$t = 1 x_1 x_2 \ldots x_{p-1} + 1;$ (ii) in a round down mode, the rounded proposed mantissa result, t, is given by the first p bits of the unrounded proposed mantissa result, i.e.:

$$t=1x_1x_2\ldots x_{p-1}; \text{ and}$$

(iii) in a round to nearest mode (which may implement a "ties-to-even" technique, as described below), the rounded proposed mantissa result, t, is given by the first p bits of the unrounded proposed mantissa result plus 2 times the $(p+1)^{th}$ bit of the unrounded proposed mantissa result, i.e.:

$$t=1x_1x_2\ldots x_{p-1}+2x_p.$$

1.2) For a subnormal result with k leading zeroes, the unrounded proposed mantissa result, which comprises s bits, includes (m−k) bits of precision. That is, the converging approximation technique is iterated until the unrounded proposed mantissa result has (m−k) bits which are accurate. As with normal results, the extra precision provided by the unrounded proposed mantissa result compared to the precision that is required in the rounded proposed mantissa result is given by m−p. For a subnormal result with k leading zeroes:

(i) in a round up mode, the rounded proposed mantissa result, t, is given by an increment to the first (p−k) bits of the unrounded proposed mantissa result (that is $x_0$ to $x_{p-k-1}$), with k leading zeroes, i.e.:

$$t=\{k\{0\}\}1x_1x_2\ldots x_{p-k-1}+1;$$

(ii) in a round down mode, the rounded proposed mantissa result, t, is given by the first (p−k) bits of the unrounded proposed mantissa result, with k leading zeroes, i.e.:

$$t=\{k\{0\}\}1x_1x_2\ldots x_{p-k-1};$$

(iii) in a round to nearest mode (which may implement a "ties-to-even" technique, as described below), the rounded proposed mantissa result, t, is given by the first (p−k) bits of the unrounded proposed mantissa result, with k leading zeroes, plus 2 times the $(p-k+1)^{th}$ bit of the unrounded proposed mantissa result, i.e.:

$$t=\{k\{0\}\}1x_1x_2\ldots x_{p-k-1}+2x_{p-k}$$

There are 2 possible cases where the rounded proposed mantissa result, t, might differ from the expected correctly rounded mantissa result. These are:

2.1) if all of the extra bits of precision of the unrounded proposed mantissa result are ones, i.e.:
for a normal result, if $x_p x_{p+1} x_{p+2} \ldots x_{m-1} = 111 \ldots 1 = 2^{(m-p)}-1$;
and for a subnormal result, if $x_{p-k} x_{p-k+1} \ldots x_{m-k-1} = 111 \ldots 1 = 2^{(m-p)}-1$.

2.2) if the rounding mode is a round to nearest mode and if the $(p-k+1)^{th}$ bit of the unrounded proposed mantissa result is a zero but all of the other extra bits of precision of the unrounded proposed mantissa result are ones, i.e.:
for a normal result, if $x_p x_{p+1} x_{p+2} \ldots x_{m-1} = 011 \ldots 1 = 2^{(m-p-1)}-1$;
and for a subnormal result, if $x_{p-k} x_{p-k+1} \ldots x_{m-k-1} = 011 \ldots 1 = 2^{(m-p-1)}-1$.

As described above, the unrounded proposed mantissa result determined from the converging approximation technique converges to a correct result from below, such that the unrounded proposed mantissa result is never too large, but it may be too small, e.g. by one ulp. In general, the unrounded proposed mantissa result has s bits, with a precision of (m−k) bits, i.e. the first (m−k) bits of the unrounded proposed mantissa result are accurate. The unrounded proposed mantissa result provides extra precision than the precision, (p−k), that is needed in the rounded proposed mantissa result, such that, in general, (m−k)>(p−k), or simply m>p. In the cases 2.1 and 2.2 described above, an increment to the $(m-k)^{th}$ bit of the unrounded proposed mantissa result would affect the p-bit rounded proposed mantissa result. Therefore, in these cases a check procedure is performed to determine whether the correctly rounded result is t or t+1.

In one case, the check procedure determines a check parameter, g, using the rounded proposed mantissa result. The value of the check parameter, g, is used to decide whether t or t+1 is the correct result. In particular, whether g is greater than, equal to, or less than zero provides an indication as to whether t or t+1 is the correctly rounded result. In this case, a different check procedure is used for each combination of (i) a floating point operation, (ii) a rounding mode and (iii) whether it is a normal or a subnormal result.

For example, for a divide operation with two inputs, a and b, where the floating point result is given by a/b then the check parameter is determined in the following ways:

A. For a round down mode with a normal result, the check parameter, g, is determined as g=(t+1)·b−a. For a round down mode with a subnormal result, the check parameter, g, is determined as $g=2^k(t+1)\cdot b-a$. In these cases, if g>0 then the rounded proposed mantissa result, t, is the correctly rounded result. If g≤0 then an increment to the rounded proposed mantissa result, i.e. t+1, is the correctly rounded result. If g=0 then the increment to the rounded proposed mantissa result, i.e. t+1, is exactly the correct result.

B. For a round up mode with a normal result, the check parameter, g, is determined as g=t·b−a. For a round up mode with a subnormal result, the check parameter, g, is determined as $g=2^k t\cdot b-a$. In these cases, if g≥0 then the rounded proposed mantissa result, t, is the correctly rounded result. If g<0 then an increment to the rounded proposed mantissa result, i.e. t+1, is the correctly rounded result. If g=0 then the rounded proposed mantissa result, t, is exactly the correct result.

C. For a round to nearest mode, two different checks can be performed to determine, (i) whether the rounded result is exact, and (ii) what is the correctly rounded result. It is noted that with the round down and round up rounding modes, both of these questions are answered with a single check parameter, whereas for the round to nearest rounding mode, the two questions are answered with different check parameters (only one of which needs to be performed at any given time, depending on whether the check condition is case 2.1 or 2.2 as described above).

C(i): in the case of 2.1 described above, (in which for a normal result $x_p x_{p+1} x_{p+2} \ldots x_{m-1}=2^{(m-p)}-1$, or for a subnormal result $x_{p-k} x_{p-k+1} \ldots x_{m-k-1}=2^{(m-p)}-1$), the check parameter, g, can determine whether the rounded proposed mantissa result is exact. With a normal result, the check parameter, g, is determined as g=t·b−a. With a subnormal result, the check parameter, g, is determined as $g=2^k t\cdot b-a$. In these cases, t is the correctly rounded result, and if g=0 then the rounded proposed mantissa result, t, is exactly the correct result.

C(ii): in the case of 2.2 described above (in which for a normal result $x_p x_{p+1} x_{p+2} \ldots x_{m-1}=2^{(m-p-1)}-1$, or for a subnormal result $x_{p-k} x_{p-k+1} \ldots x_{m-k-1}=2^{(m-p-1)}-1$), the check parameter, g, can determine whether the rounded proposed mantissa result, t, or an increment to the rounded proposed mantissa result, i.e. t+1, is the correctly rounded mantissa result. With a normal result, the check parameter, g, is determined as g=(t+½)·b−a.

With a subnormal result, the check parameter, g, is determined as $g=2^k(t+\frac{1}{2})\cdot b-a$. In these cases, if $g>0$ then the rounded proposed mantissa result, t, is the correctly rounded result. If $g<0$ then an increment to the rounded proposed mantissa result, i.e. t+1, is the correctly rounded result. If $g=0$ and the least significant bit of t is a one (i.e. if t is odd) then an increment to the rounded proposed mantissa result, i.e. t+1, is the correctly rounded result (where the rounding mode is a ties-to-even rounding mode). If $g=0$ and the least significant bit of t is a zero (i.e. if t is even) then the rounded proposed mantissa result, t, is the correctly rounded result (where the rounding mode is a ties-to-even rounding mode).

As another example, for a square root operation with one input, a, the floating point result is given by $\sqrt{a}$. In this case the result will not be subnormal because the square root operation halves the exponent. For a square root operation the check parameter, g, is determined in the following ways:

A. For a round down mode with a normal result, the check parameter, g, is determined as $g=(t+1)^2-a$. In this case, if $g>0$ then the rounded proposed mantissa result, t, is the correctly rounded result. If $g\leq0$ then an increment to the rounded proposed mantissa result, i.e. t+1, is the correctly rounded result. If $g=0$ then the increment to the rounded proposed mantissa result, i.e. t+1, is exactly the correct result.

B. For a round up mode with a normal result, the check parameter, g, is determined as $g=t^2-a$. In this case, if $g\geq0$ then the rounded proposed mantissa result, t, is the correctly rounded result. If $g<0$ then an increment to the rounded proposed mantissa result, i.e. t+1, is the correctly rounded result. If $g=0$ then the rounded proposed mantissa result, t, is exactly the correct result.

C. For a round to nearest mode, two different checks can be performed to determine, (i) whether the rounded result is exact, and (ii) what is the correctly rounded result (only one of which needs to be performed at any given time, depending on whether the check condition is case 2.1 or 2.2 as described above).

C(i): in the case of 2.1 described above, (in which for a normal result $x_p x_{p+1} x_{p+2} \ldots x_{m-1}=2^{(m-p)}-1$), the check parameter, g, can determine whether the rounded proposed mantissa result is exact. The check parameter, g, is determined as $g=t^2-a$. In this case, t is the correctly rounded result, and if $g=0$ then the rounded proposed mantissa result, t, is exactly the correct result.

C(ii): in the case of 2.2 described above (in which for a normal result $x_p x_{p+1} x_{p+2} \ldots x_{m-1}=2^{(m-p-1)}-1$), the check parameter, g, can determine whether the rounded proposed mantissa result, t, or an increment to the rounded proposed mantissa result, i.e. t+1, is the correctly rounded mantissa result. The check parameter, g, is determined as $g=(t+\frac{1}{2})^2-a$. In this case, if $g>0$ then the rounded proposed mantissa result, t, is the correctly rounded result. If $g<0$ then an increment to the rounded proposed mantissa result, i.e. t+1, is the correctly rounded result. In this case g is never equal to 0, because when the result of a square root operation is exact it has fewer digits than the input (e.g., an input of 169 has 3 digits, and the result of the square root operation on 169 is 13 which has only 2 digits). To be exactly half way between two representable p-bit numbers (i.e. to have g=0 in this case) would mean that the input would have to have nearly 2p bits, which is never the case since the input only contains p bits.

It can be appreciated that the check procedure described above uses 12 different functions (8 for the divide operation, and 4 for the square root operation) for different combinations of rounding mode and normal/subnormal result and for different check condition (e.g. case 2.1 or 2.2). Handling each of these different functions differently increases the size and complexity of the computer hardware needed to implement the check procedure. Furthermore, it can be appreciated that in order to handle subnormal results, the rounded proposed results are shifted (i.e. normalised) by a variable factor of $2^k$ for the check procedure (k is variable). This shifting may reduce the speed with which the check procedure is carried out. It is expensive in terms of speed and size to implement a variable amount of shifting.

Examples are described below, by way of example only, which address the problems with the check procedure described above. In particular, only 2 different functions (compared to 12 different functions described above) are used to implement the check procedures in the cases described above. This results in a faster check procedure and smaller and simpler hardware for implementing the check procedure.

FIG. 1 shows an example of a computer system 100 for implementing a floating point operation on one or more floating point inputs. The computer system 100 may be implemented in hardware or software. Implementing the system 100 in hardware may allow for faster computation. The computer system 100 comprises converging approximation logic 102; determining logic 104 which comprises rounding logic 106 and selection logic 108; decision logic 110 and check logic 112. In some examples, the logic shown in FIG. 1 is implemented in hardware, e.g. as fixed function circuitry in a computer processor. In other examples, the logic shown in FIG. 1 is implemented in software to be executed on a processor. Each logic block shown in FIG. 1 may be implemented as one or more modules or units within the computer system 100. The system 100 is arranged to receive one or more floating point mantissa inputs. In particular, the input(s) are arranged to be received at an input of the converging approximation logic 102 and at a first input of the check logic 112. An output of the converging approximation logic 102 is coupled to an input of the rounding logic 106, to an input of the decision logic, and to a second input of the check logic 112. An output of the rounding logic 106 is coupled to a first input of the selection logic 108. An output of the decision logic 110 is coupled to a third input of the check logic 112, and to a second input of the selection logic 108. An output of the check logic 112 is coupled to a third input of the selection logic 108. An output of the selection logic 108 is arranged to provide the floating point mantissa of the result of a floating point operation, as an output of the computer system 100.

Figure 2:
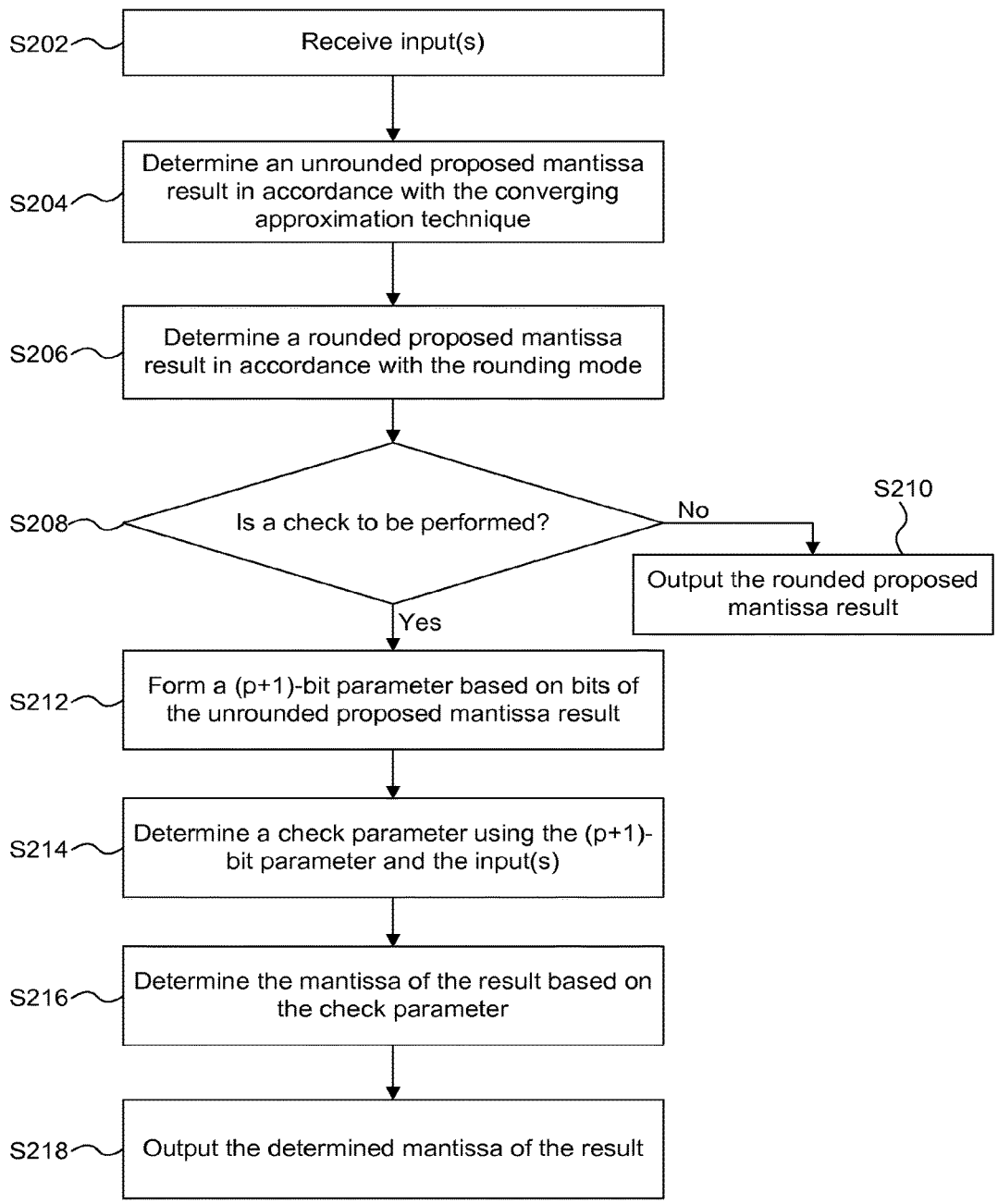
FIG. 2 shows a flow chart for a method of implementing a floating point operation using the computer system.

The operation of the computer system 100 is described with reference to FIG. 2 which shows a method of implementing a floating point operation using the computer system 100. The system 100 is used to perform a floating point operation on at least one floating point input using a converging approximation technique as described above, and to perform a check procedure when a check is needed. For each floating point operation, the check procedure uses a unified procedure for normal and subnormal results and for all three rounding modes mentioned above (round up, round down and round to nearest). The method is first described below for a floating point divide operation, which determines a result of a/b, where a and b are floating point inputs.

In step S202 the floating point inputs (a and b) are received at the converging approximation logic 102. In step S204 the converging approximation logic 102 determines an unrounded proposed mantissa result in accordance with a converging approximation technique. As described above, the converging approximation technique may use a quadratic convergence algorithm, e.g. to implement a Newton-Raphson technique or a Goldschmidt technique. As described above, for a normal result, the unrounded proposed mantissa result has m bits of accuracy (including bits $x_0$ to $x_{m-1}$) and is never greater than the correct result (i.e. it is either less than or equal to the exactly correct mantissa result). This is due to the nature of the convergence technique which is used in the logic 102, which converges towards a floating point result from below. The precision of the floating point result is p, i.e. the mantissa of the floating point result has p bits. For a subnormal result, where $k \neq 0$ the unrounded proposed mantissa result has (m−k) bits of accuracy (including bits $x_0$ to $x_{m-k-1}$) As described above, the unrounded proposed mantissa result actually comprises s bits, where s≥m−k, but the converging algorithm stops when (m−k) bits of accuracy is achieved. The unrounded proposed mantissa result has extra bits of precision, i.e. m>p. The unrounded proposed mantissa result output from the converging approximation logic 102 is unshifted. Therefore, for a subnormal result, the unrounded proposed mantissa result will not include the k leading zeroes.

In step S206 the rounding logic 106 receives the unrounded proposed result and determines a rounded proposed mantissa result, t, in accordance with the rounding mode. The rounding logic 106 may also determine an increment to the proposed mantissa result, i.e. t+1. As described above, the rounding mode could be any suitable rounding mode, such as a round up mode (which includes rounding to plus infinity if the sign of the result is positive and rounding to minus infinity if the sign of the result is negative), a round down mode (which includes rounding to zero irrespective of the sign of the result (e.g. truncating), rounding to minus infinity if the sign of the result is positive and rounding to plus infinity if the sign of the result is negative), and a round to nearest mode, which may for example implement a ties-to-even scheme. Techniques of rounding an unrounded result are known in the art, so the details of this process are not described in detail herein. The rounded proposed mantissa result, t, has p bits.

If the result of the floating point operation is a subnormal result, then, as described above, k leading zeroes are included in the rounded proposed mantissa result, t. With a normal result, k=0, and with a subnormal result 0<k<p.

In step S208 the decision logic 110 determines whether a check is to be performed, based on bits of the unrounded proposed mantissa result. It is noted that the decision logic 110 uses the unrounded, rather than the rounded, proposed mantissa result, so the decision in step S208 can be performed before the rounded proposed mantissa result has been determined. The situations in which a check is to be performed are mentioned above in the cases 2.1 and 2.2. In accordance with case 2.1 the decision logic 110 determines whether all of the bits from the $(p-k+1)^{th}$ bit to the $(m-k)^{th}$ bit of the unrounded proposed mantissa result are ones. That is, a check is to be performed: for a normal result, if $x_p x_{p+1} x_{p+2} \ldots x_{m-1} = 111 \ldots 1 = 2^{(m-p)} - 1$; and for a subnormal result, if $x_{p-k} x_{p-k+1} \ldots x_{m-k-1} = 111 \ldots 1 = 2^{(m-p)} - 1$. Furthermore, in accordance with case 2.2, if the rounding mode is a round to nearest mode, the decision logic 110 determines whether the $(p-k+1)^{th}$ bit of the unrounded proposed mantissa result is a zero and all of the bits from the $(p-k+2)^{th}$ bit to the $(m-k)^{th}$ bit of the unrounded proposed mantissa result are ones. That is, a check is to be performed if the rounding mode is a round to nearest mode and for a normal result, if $x_p x_{p+1} x_{p+2} \ldots x_{m-1} = 011 \ldots 1 = 2^{(m-p-1)} - 1$; or for a subnormal result, if $x_{p-k} x_{p-k+t} \ldots x_{m-k-1} = 011 \ldots 1 = 2^{(m-p-1)} - 1$.

If it is determined in step S208 that a check is not to be performed then the rounded proposed mantissa result, t, is the correct result. This is because any inaccuracy in the $(m-k)^{th}$ bit of the unrounded proposed mantissa result will not affect the p-bit rounded proposed mantissa result, t. Therefore, the decision logic 110 sends an indication to the selection logic 108 to indicate that the rounded proposed mantissa result, t, is correct and the method passes to step S210 in which the selection logic 108 outputs the rounded proposed mantissa result, t, as the p-bit mantissa of the floating point result.

However, if it is determined in step S208 that a check is to be performed (i.e. if it is determined that any inaccuracy in the $(m-k)^{th}$ bit of the unrounded proposed mantissa result will affect the p-bit rounded proposed mantissa result, t) then the decision logic sends an indication to the check logic (and also optionally to the selection logic 108) to indicate that a check is to be performed, and the method passes from step S208 to step S212.

In steps S212 and S214 the check logic uses the floating point inputs (a and b in this example) and bits of the unrounded proposed mantissa result to determine a check parameter, g. The check parameter, g, is indicative of a relationship between: (i) an exact result of the floating point operation on the floating point inputs (i.e. an exact result of a/b in this example), and (ii) the unrounded proposed mantissa result if the $(m-k)^{th}$ bit were incremented.

That is, in step S212 a (p+1)-bit parameter, c, is formed based on bits of the unrounded proposed mantissa result. The parameter, c, comprises the most significant (p−k+1) bits of the unrounded mantissa result with k trailing ones. The parameter, c, may be formed using the (p+1) most significant bits of the unrounded proposed mantissa result (i.e. $1 x_1 x_2 \ldots x_p$) and applying a fill mask of k ones to the k least significant of said (p+1) most significant bits of the unrounded proposed mantissa result. This can be written as:

$$c = \{1 x_1 \ldots x_p\} | \{k\{1\}\}. \quad (1)$$

The value of k can be determined in any suitable manner, e.g. as an output of the determination of the exponent of the floating point result or by counting the leading zeroes of the rounded proposed mantissa result, t. Methods for counting the number of leading zeroes of a number are known in the art. It is noted that the value of k is the number of bits that the unrounded proposed mantissa result has to be right-shifted by in order to obtain the denormal value, so the value of k has to be determined to obtain a denormal (i.e. subnormal) result.

An increment to the least significant bit of the (p+1)-bit parameter, c, (i.e. c+½ where the parameter is to be used to represent a p-bit result) is representative of the unrounded proposed mantissa result if the $(m-k)^{th}$ bit were incremented. This is true for cases in which the decision logic 110 determines that a check is to be performed.

In step S214 the check logic determines the check parameter, g, using the parameter, c, and the floating point inputs, a and b. In particular, the value of the incremented parameter (i.e. c+½) is used to determine the check parameter, g, according to the equation:

$$g = (c + \tfrac{1}{2}) \cdot b - a \quad (2)$$

In this way, the least significant bit of the (p+1)-bit parameter, c, is incremented and then compared with the exact result of the floating point operation to thereby determine the check parameter, g. For a floating point divide operation, as indicated in equation (2), the incremented parameter (c+½) is compared with the exact result $$\frac{a}{b},$$

by multiplying the incremented parameter (c+½) by the input b and subtracting the input a.

The check parameter, g, determined in step S214 is provided from the check logic 112 to the selection logic 108. In step S216 the selection logic 108 uses the check parameter to determine that the p-bit mantissa of the floating point result of the floating point operation is either: (i) the rounded proposed mantissa result, t, determined by the rounding logic 106, or (ii) an increment to the rounded proposed mantissa result, i.e. t+1. The selection of either t or t+1 is performed in the same manner as described above, based on whether g is greater than, less than or equal to zero, and also based on the rounding mode. That is, if g>0, the p-bit mantissa of the floating point result is determined to be the p-bit rounded proposed mantissa result, t. If g<0, the p-bit mantissa of the floating point result is determined to be an increment to the p-bit rounded proposed mantissa result, i.e. t+1. If g=0, the p-bit mantissa of the floating point result is determined, in dependence upon one or both of: (a) the rounding mode, and (b) the $p^{th}$ bit of the rounded proposed mantissa result, t, to be either: (i) the p-bit rounded proposed mantissa result, t, or (ii) an increment to the p-bit rounded proposed mantissa result, i.e. t+1.

In step S218 the selection logic 108 outputs the determined mantissa of the floating point result as an output of the system 100. It is noted that the rounding logic 106 and the selection logic 108 may be combined, and together they operate as the determining logic 104 for determining the mantissa of the floating point result based on: (i) the unrounded proposed mantissa result, (ii) an optional indication from the decision logic 110 as to whether a check is to be performed, and (iii) the check parameter, g, if a check is to be performed.

In particular, it is noted that the rounded proposed mantissa result, t, is not used by either the decision logic 110 or the check logic 112. This is in contrast to the examples described above in which different algorithms are used to determine the check parameter, g, for different rounding modes and for normal/subnormal results. Therefore, the method of determining the check parameter, g, using the system 100 and in accordance with the flow chart shown in FIG. 2 does not need to wait for the rounded proposed mantissa result, t, to be determined. This can result in a quicker process for determining the check parameter, g. Furthermore, the determination of the check procedure does not require any shifting operations (e.g. by a factor of $2^k$) which consume time and processing resources to perform.

The equations (1) and (2) given above are used for each rounding mode (round up, round down and round to nearest) and for both normal and subnormal results to determine the check parameter, g, using bits of the unrounded proposed mantissa result. In this sense a unified procedure is provided for determining the check parameter. This helps to reduce the size and complexity of the logic needed in the check logic 112 for determining the check parameter, g, since it is the same procedure for each of the rounding modes and normal/subnormal results. There is provided below a quick demonstration that the unified procedure given by the equations (1) and (2) does provide the same results for the check parameter, g, as given by the 8 different algorithms for determining the check parameter for a floating point divide operation described previously:

For a round down mode with a normal result, where k=0:
according to equation (1), $c=\{1x_1 \ldots x_p\}$. Since the check is being performed, $x_p=1$. Therefore, c=t+½. As described above, in this case, g=(t+1)·b−a=(c+½)·b−a, which matches equation (2).

For a round down mode with a subnormal result, where k≠0:
according to equation (1), the first (p−k+1) bits of c are $\{1x_1 \ldots x_{p-k}\}$, and the last k bits of c are all ones. Since the check is being performed, $x_{p-k}=1$. Therefore, $c=2^k t+2^k-½$. As described above, in this case, $g=2^k(t+1)·b-a=(c+½)·b-a$, which matches equation (2).

For a round up mode with a normal result, where k=0:
according to equation (1), $c=\{1x_1 \ldots x_p\}$. Since the check is being performed, $x_p=1$. Therefore, c=t−½. As described above, in this case, g=t·b−a=(c+½)·b−a, which matches equation (2).

For a round up mode with a subnormal result, where k≠0:
according to equation (1), the first (p−k+1) bits of c are $\{1x_1 \ldots x_{p-k}\}$, and the last k bits of c are all ones. Since the check is being performed, $x_{p-k}=1$. Therefore, $c=2^k(t-1)+2^k-½$. As described above, in this case, $g=2^k t·b-a=(c+½)·b-a$, which matches equation (2).

For a round to nearest mode with a normal result, where k=0, in case 2.1 where the bits of the unrounded proposed mantissa result from $x_p$ to $x_{m-1}$ are all ones:
according to equation (1), $c=\{1x_1 \ldots x_p\}$. Since the check is being performed, $x_p=1$. Therefore, c=t−½. As described above, in this case, g=t·b−a=(c+½)·b−a, which matches equation (2).

For a round to nearest mode with a subnormal result, where k≠0, in case 2.1 where the bits of the unrounded proposed mantissa result from $x_{p-k}$ to $x_{m-k-1}$ are all ones:
according to equation (1), the first (p−k+1) bits of c are $\{1x_1 \ldots x_{p-k}\}$, and the last k bits of c are all ones. Since the check is being performed, $x_{p-k}=1$. Therefore, $c=2^k(t-1)+2^k-½$. As described above, in this case, $g=2^k t·b-a=(c+½)·b-a$, which matches equation (2).

For a round to nearest mode with a normal result, where k=0, in case 2.2 where the $(p+1)^{th}$ bit of the unrounded proposed mantissa result, $x_p$ is a zero and the bits of the unrounded proposed mantissa result from $x_{p+1}$ to $x_{m-1}$ are all ones:
according to equation (1), $c=\{1x_1 \ldots x_p\}$. Since the check is being performed, $x_p=0$. Therefore, c=t. As described above, in this case, g=(t+½)·b−a=(c+½)·b−a, which matches equation (2).

For a round to nearest mode with a subnormal result, where k≠0, in case 2.2 where the $(p+1)^{th}$ bit of the unrounded proposed mantissa result, $x_p$ is a zero and the bits of the unrounded proposed mantissa result from $x_{p+1}$ to $x_{m-1}$ are all ones:
according to equation (1), the first (p−k+1) bits of c are $\{1x_1 \ldots x_{p-k}\}$, and the last k bits of c are all ones. Since the check is being performed, $x_{p-k}=0$. Therefore, $c=2^k t+2^{k-1}-½=2^k(t+½)-½$. As described above, in this case, $g=2^k(t+½)·b-a=(c+½)·b-a$, which matches equation (2).

It is therefore apparent that equations (1) and (2) can be used for the check procedure of a floating point divide operation for all of the eight checks described above.

The method is described above in relation to a floating point divide operation. A corresponding method can be implemented for performing other floating point operations which use a converging approximation technique which converges to the floating point result from below. For example, a corresponding method can be implemented for performing a floating point square root operation. For use with a square root operation, the parameter, c, can be determined in the same way (i.e. in accordance with equation (1)), but the equation for determining the check parameter will need to be changed because a different operation is being performed.

In particular, for a square root operation, the check parameter, g, can be determined, based on the unrounded proposed mantissa result according to the equation:

$$g=(c+\tfrac{1}{2})^2-a \qquad (3)$$

That is, for a floating point square root operation, as indicated in equation (3), the incremented parameter $(c+\tfrac{1}{2})$ is compared with the exact result $\sqrt{a}$ by squaring the incremented parameter $(c+\tfrac{1}{2})$ and subtracting the input a.

The equations (1) and (3) given above are used for each rounding mode (round up, round down and round to nearest) for normal results (note that subnormal results are not relevant to the results of a square root operation) to determine the check parameter, g, using bits of the unrounded proposed mantissa result. In this sense a unified procedure is provided for determining the check parameter for square root operations. This helps to reduce the size and complexity of the logic needed in the check logic 112 for determining the check parameter, g, since it is the same procedure for each of the rounding modes. There is provided below a quick demonstration that the unified procedure given by the equations (1) and (3) does provide the same results for the check parameter, g, as given by the 4 different algorithms for determining the check parameter for a floating point square root operation described previously:

For a round down mode with a normal result, where k=0: according to equation (1), $c=\{1x_1 \ldots x_p\}$. Since the check is being performed, $x_p=1$. Therefore, $c=t+\tfrac{1}{2}$. As described above, in this case, $g=(t+1)^2-a=(c+\tfrac{1}{2})^2-a$, which matches equation (3).

For a round up mode with a normal result, where k=0: according to equation (1), $c=\{1x_1 \ldots x_p\}$. Since the check is being performed, $x_p=1$. Therefore, $c=t-\tfrac{1}{2}$. As described above, in this case, $g=t^2-a=(c+\tfrac{1}{2})^2-a$, which matches equation (3).

For a round to nearest mode with a normal result, where k=0, in case 2.1 where the bits of the unrounded proposed mantissa result from $x_p$ to $x_{m-1}$ are all ones: according to equation (1), $c=\{1x_1 \ldots x_p\}$. Since the check is being performed, $x_p=1$. Therefore, $c=t-\tfrac{1}{2}$. As described above, in this case, $g=t^2-a=(c+\tfrac{1}{2})^2-a$, which matches equation (3).

For a round to nearest mode with a normal result, where k=0, in case 2.2 where the $(p+1)^{th}$ bit of the unrounded proposed mantissa result, $x_p$ is a zero and the bits of the unrounded proposed mantissa result from $x_{p+1}$ to $x_{m-1}$ are all ones: according to equation (1), $c=\{1x_1 \ldots x_p\}$. Since the check is being performed, $x_p=0$. Therefore, c=t. As described above, in this case, $g=(t+\tfrac{1}{2})^2-a=(c+\tfrac{1}{2})^2-a$, which matches equation (3).

It is therefore apparent that equations (1) and (3) can be used for the check procedure of a floating point square root operation for all of the four checks described above.

By using the bits of the unrounded proposed mantissa result with k trailing ones, as described by equation (1), a unified check procedure can be performed which is the same for each rounding mode and irrespective of whether the result is normal or subnormal. Since only one function is needed per floating point operation, a unified masking scheme can be implemented which helps to reduce the size and complexity of the system 100 as well as reducing the delay in determining the check parameter can therefore reducing the delay in determining the floating point result. Furthermore, the check procedure can be started as soon as the unrounded proposed mantissa result has been determined, without needing to wait for the rounded proposed mantissa result to be determined. Furthermore, no shifting operations are needed in the check logic 112.

It is noted that the exponent of the floating point result may be calculated separately to the mantissa of the floating point result. Methods for calculating the exponent of the floating point result are known in the art. The calculation of the exponent may be performed before the calculation of the mantissa, and if the result is subnormal then the number of leading zeroes (i.e. the value of k) can be determined from the exponent calculation and then used in the mantissa calculation.

In summary of examples described above, the check procedure for checking the proposed mantissa result is carried out without regard to the exponent value of the result. Thus, even if the result is subnormal, this is not taken into account until the proposed mantissa result is calculated in the determining module 104, and at that time the rounded proposed mantissa result is right shifted by k bits to create the subnormal representation. This means that the check procedure performed by the decision logic 110 and the check logic 112 is carried out using the pre-shifted (i.e. unshifted) unrounded proposed mantissa result, which has (m−k) bits of precision. A shifting of the (m−k) bits of the unrounded proposed mantissa result with k leading zeroes provides an m-bit result which has the same extra precision (i.e. an extra (m−p) bits of precision) as is the case with normal results where k=0.

In the examples described above, the determining logic 104 comprises rounding logic 106 which determines the rounded proposed mantissa result, t, based on the unrounded proposed mantissa result irrespective of the result of the check procedure. In other examples, the determining logic might not determine the rounded proposed mantissa result, t, before the check parameter has been received from the check logic 112. For example, if, as a result of the check procedure, the output from the determining logic 104 is an increment to the rounded proposed mantissa result, i.e. t+1, then the determining logic 104 may determine the value of t+1 without first determining the value of t.

Figure 3:
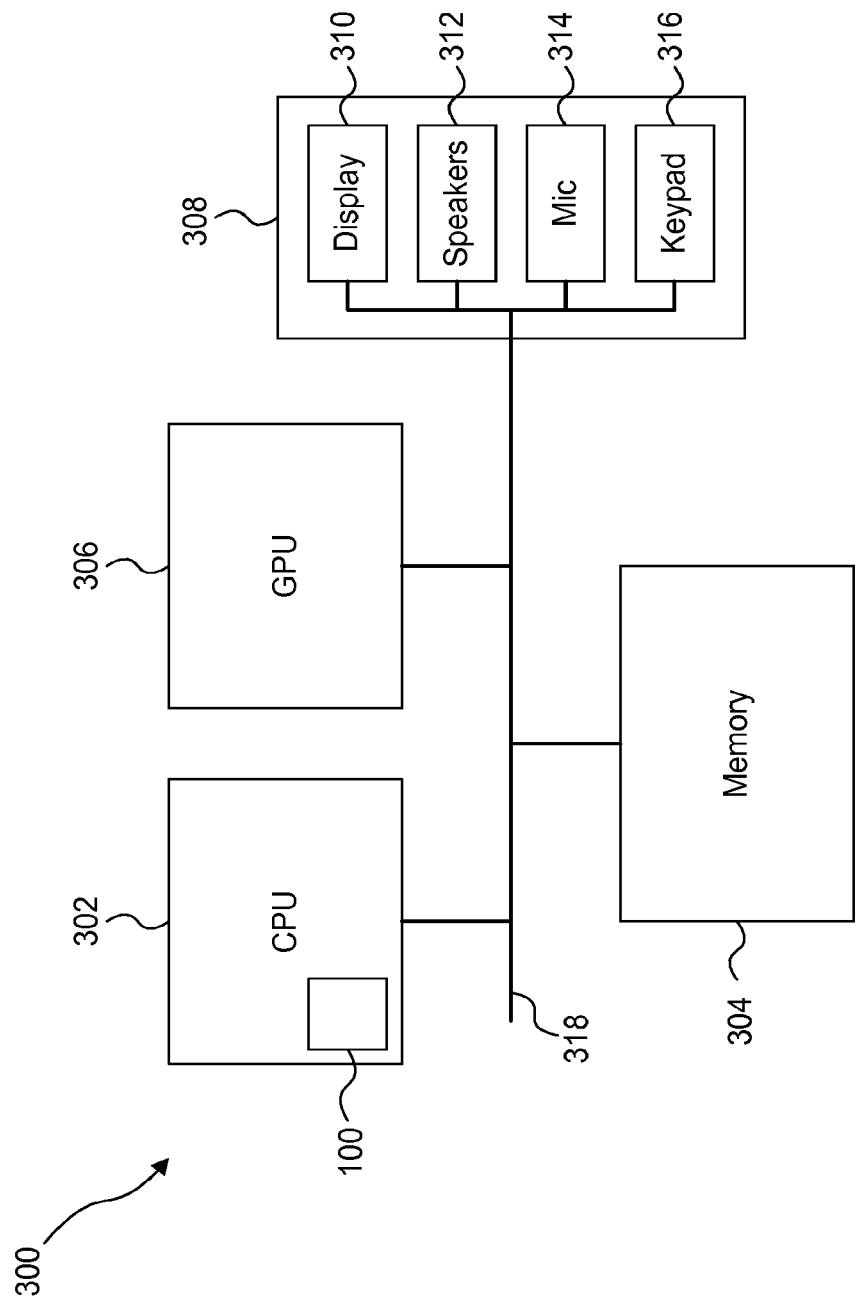
FIG. 3 shows a high-level representation of a computer system.

The computing system 100 described above with reference to FIG. 1 can be implemented as a unit at a processor in a larger computer system. For example, FIG. 3 shows a larger computer system 300 which comprises a processor 302 on which the system 100 is implemented. The processor 302 is a central processing unit (CPU). In the example shown in FIG. 3, the computer system 300 also comprises a memory 1104, a graphics processing unit (GPU) 306 and other devices 308, such as a display 310, speakers 312, a microphone 314 and a keypad 316. The components of the computer system 300 can communicate with each other via a communications bus 318.

Generally, any of the functions, methods, techniques or components described above can be implemented in modules using software, firmware, hardware (e.g., fixed logic circuitry) or any combination of these implementations. The terms "module", "block" and "logic" are used herein to represent hardware, including fixed function, reconfigurable, or general purpose programmable hardware and combinations thereof. As such a module configured to perform a recited function includes some selection of hardware configured to or otherwise arranged to perform that function.

In the case of a software implementation, a software module, represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques, logic or methods may be carried out by a dedicated circuit, an application-specific integrated circuit, a programmable logic array, a field-programmable gate array, or the like. For example, the module, block, unit or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, block, unit or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, block, unit or logic described above, such as HDL (hardware description language) software, as is used for designing integrated circuits, or for configuring programmable chips, to carry out desired functions. That is, there may be provided a computer readable storage medium having encoded thereon computer readable program code for generating a computer system (e.g. computer hardware) configured to perform any of the methods described herein, or for generating a computer system (e.g. computer hardware) comprising any apparatus described herein. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of processing data in a computer system for implementing a floating point operation on at least one input value in accordance with any rounding mode for rounding unrounded results, the computer system comprising an approximation module, a check module and a determining module, the method comprising:

determining, by said approximation module, an unrounded proposed mantissa result of the floating point operation on the at least one input value, wherein a rounded proposed mantissa result corresponds to a rounding of the unrounded proposed mantissa result in accordance with the rounding mode, wherein the unrounded proposed mantissa result comprises x bits of precision;

if an increment to an $x^{th}$ bit of the unrounded proposed mantissa result would affect the rounded proposed mantissa result:

using the at least one input value and bits of the unrounded proposed mantissa result to determine, by said check module, a check parameter which is indicative of a relationship between: (i) an exact result of the floating point operation on the at least one input value, and (ii) an unrounded proposed mantissa result if the $x^{th}$ bit were incremented; and determining, by said determining module, a mantissa of a floating point result, in dependence upon the check parameter, to be either: (i) the rounded proposed mantissa result, or (ii) an increment to the rounded proposed mantissa result; and outputting the determined mantissa of the floating point result.

2. The method of claim 1 wherein the rounded proposed mantissa result comprises p bits, with k leading zeroes, where 0≤k<p,
   wherein the unrounded proposed mantissa result comprises (m−k) bits of precision, where p and m are positive integers and m>p, and
   wherein the mantissa of the floating point result comprises p bits.

3. The method of claim 2 wherein said $x^{th}$ bit of the unrounded proposed mantissa result is the $(m-k)^{th}$ bit of the unrounded proposed mantissa result.

4. The method of claim 3 further comprising determining, by a decision module of the computer system, whether an increment to the $(m-k)^{th}$ bit of the unrounded proposed mantissa result would affect the p-bit rounded proposed mantissa result, wherein said determining whether an increment to the $(m-k)^{th}$ bit of the unrounded proposed mantissa result would affect the p-bit rounded proposed mantissa result comprises determining whether all of the bits from the $(p-k+1)^{th}$ bit to the $(m-k)^{th}$ bit of the unrounded proposed mantissa result are ones.

5. The method of claim 3 further comprising determining, by a decision module of the computer system, whether an increment to the $(m-k)^{th}$ bit of the unrounded proposed mantissa result would affect the p-bit rounded proposed mantissa result, wherein the rounding mode is a round to nearest mode, and wherein said determining whether an increment to the $(m-k)^{th}$ bit of the unrounded proposed mantissa result would affect the p-bit rounded proposed mantissa result comprises determining whether the $(p-k+1)^{th}$ bit of the unrounded proposed mantissa result is a zero and all of the bits from the $(p-k+2)^{th}$ bit to the $(m-k)^{th}$ bit of the unrounded proposed mantissa result are ones.

6. The method of claim 3 wherein said using the at least one input value and bits of the unrounded mantissa result to determine a check parameter comprises: forming a (p+1)-bit parameter comprising the most significant (p−k+1) bits of the unrounded mantissa result with k trailing ones, wherein an increment to the least significant bit of the (p+1)-bit parameter is representative of the unrounded proposed mantissa result if the $(m-k)^{th}$ bit were incremented.

7. The method of claim 6 further comprising incrementing the least significant bit of the (p+1)-bit parameter, and comparing the incremented parameter with said exact result of the floating point operation to thereby determine the check parameter.

8. The method of claim 7 wherein there is a first floating point input value, a, and a second floating point input value, b, and wherein the floating point operation is a divide operation to determine the result of a/b, and wherein said comparing the incremented parameter with said exact result of the floating point operation to thereby determine the check parameter comprises multiplying the incremented parameter by the second floating point input value, b, and subtracting the first floating point input value, a.

9. The method of claim 7 wherein there is a first floating point input value, a, and wherein the floating point operation is a square root operation to determine the result of $\sqrt{a}$, and wherein said comparing the incremented parameter with said exact result of the floating point operation to thereby determine the check parameter comprises squaring the incremented parameter and subtracting the first floating point input value, a.

10. The method of claim 2 wherein either the floating point result is a normal result such that k=0, or the floating point result is a subnormal result such that k>0.

11. The method of claim 1 further comprising determining, by a decision module of the computer system, whether an increment to the $x^{th}$ bit of the unrounded proposed mantissa result would affect the rounded proposed mantissa result.

12. The method of claim 1 wherein the step of determining the mantissa of the floating point result, in dependence upon the check parameter, comprises:
    if the check parameter is greater than zero, determining the mantissa of the floating point result to be the rounded proposed mantissa result;
    if the check parameter is less than zero, determining the mantissa of the floating point result to be an increment to the rounded proposed mantissa result; and
    if the check parameter equals zero, determining the mantissa of the floating point result, in dependence upon one or both of: (a) the rounding mode, and (b) the least significant bit of the rounded proposed mantissa result, to be either: (i) the rounded proposed mantissa result, or (ii) an increment to the rounded proposed mantissa result.

13. The method of claim 1 wherein the unrounded proposed mantissa result is determined in accordance with a converging approximation technique which converges toward the floating point result from below, wherein the converging approximation technique is a Newton-Raphson technique or a Goldschmidt technique.

14. The method of claim 1 wherein if it is determined that an increment to the $x^{th}$ bit of the unrounded proposed mantissa result would not affect the rounded proposed mantissa result, then the mantissa of the floating point result is determined to be the rounded proposed mantissa result.

15. A computer system configured to process data for implementing a floating point operation on at least one input value, in accordance with any rounding mode for rounding unrounded results, the computer system comprising:
    an approximation module configured to determine an unrounded proposed mantissa result of the floating point operation on the at least one input value, wherein a rounded proposed mantissa result corresponds to a rounding of the unrounded proposed mantissa result in accordance with the rounding mode, wherein the unrounded proposed mantissa result comprises x bits of precision;
    a check module configured to use the at least one input value and bits of the unrounded proposed mantissa result to determine a check parameter which is indicative of a relationship between: (i) an exact result of the floating point operation on the at least one input value, and (ii) an unrounded proposed mantissa result if an $x^{th}$ bit were incremented; and
    a determining module configured to determine a mantissa of a floating point result, in dependence upon the check parameter, to be either: (i) the rounded proposed mantissa result, or (ii) an increment to the rounded proposed mantissa result;
wherein the computer system is configured to process the determined mantissa of the floating point result.

16. The computer system of claim 15 further comprising a decision module configured to determine whether a check is to be performed by the check module based on whether an increment to the $x^{th}$ bit of the unrounded proposed mantissa result would affect the rounded proposed mantissa result.

17. The computer system of claim 15 wherein the determining module comprises:
- a rounding sub-module configured to determine the rounded proposed mantissa result in accordance with the rounding mode based on the determined unrounded proposed mantissa result; and
- a selection sub-module configured to select, in dependence upon the check parameter, either: (i) the determined rounded proposed mantissa result, or (ii) an increment to the determined rounded proposed mantissa result.

18. The computer system of claim 15 wherein the rounding mode is one of: (i) a round towards zero mode, (ii) a round away from zero mode, and (iii) a round to nearest mode.

19. The computer system of claim 15 wherein the approximation module, the check module and the determining module are implemented in hardware as fixed-function circuitry modules.

20. A non-transitory computer readable storage medium having stored thereon a computer readable description of a hardware configuration, which when processed causes a manufacturing system to generate a computer system according to claim 15.

* * * * *